L. QUINTAL.
VEHICLE TIRE.
APPLICATION FILED SEPT. 21, 1910.

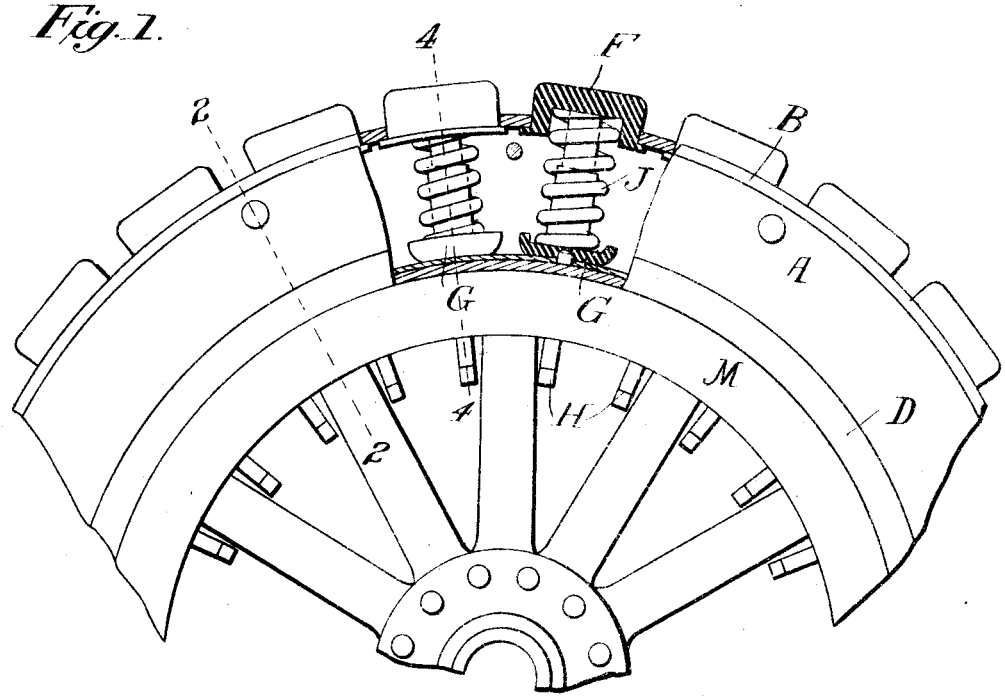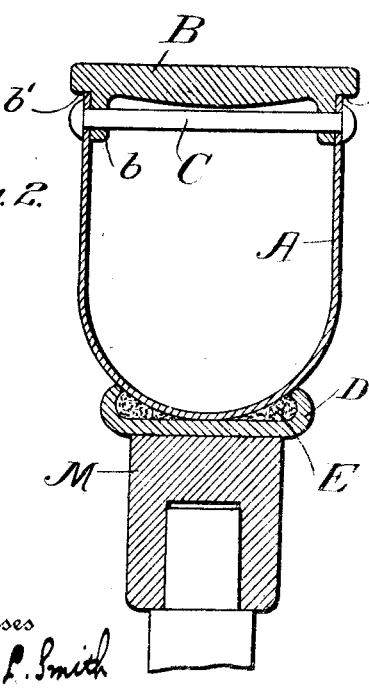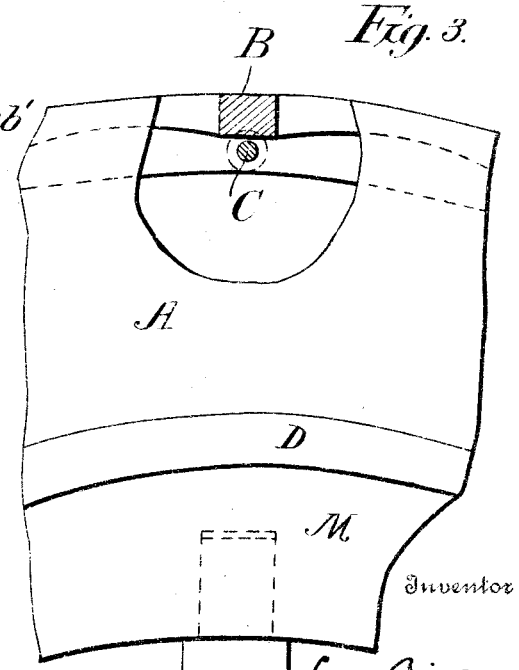

1,030,537.

Patented June 25, 1912.

2 SHEETS—SHEET 2.

Witnesses
W. L. Richey
Stedman J. Rockwell

Inventor
Lewis Quintal
By Bommhardt & Co.
Attorney.

UNITED STATES PATENT OFFICE.

LEWIS QUINTAL, OF CLEVELAND, OHIO.

VEHICLE-TIRE.

1,030,537.     Specification of Letters Patent.     Patented June 25, 1912.

Application filed September 21, 1910. Serial No. 583,063.

*To all whom it may concern:*

Be it known that I, LEWIS QUINTAL, citizen of the United States, residing at Cleveland, in the county of Cuyahoga and State of Ohio, have invented certain new and useful Improvements in Vehicle-Tires, of which the following is a specification.

This invention relates to vehicle tires, and especially to tires capable of use on automobiles.

An object of the invention is to provide an all steel vehicle tire, which is simple in form, and which by means of metallic springs has a resiliency similar to that of the common pneumatic tire.

The invention is characterized by the provision of a hollow rim made in sections, and having improved means for connecting the sections together, and said rim is provided with a series of plungers projecting at the tread, said plungers being spring supported, and projecting beyond the rim to prevent skidding or slipping.

The invention may be embodied in various forms, of which some are illustrated in the accompanying drawings.

Figure 4:
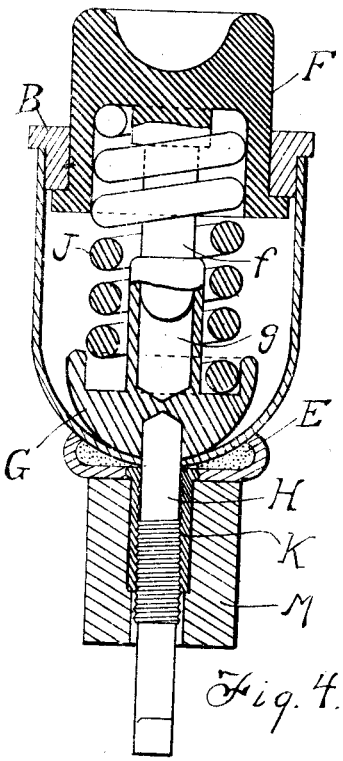
Figure 6:
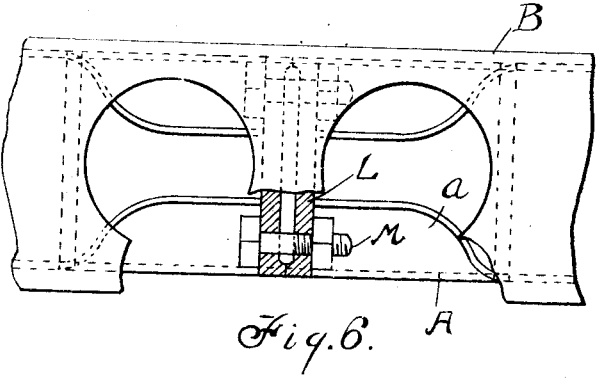
Figure 5:
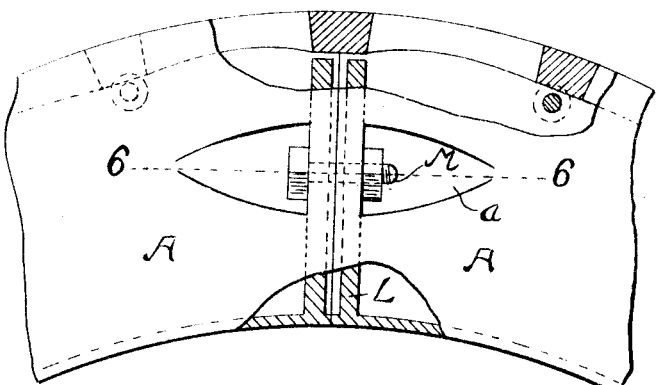
Figure 8:
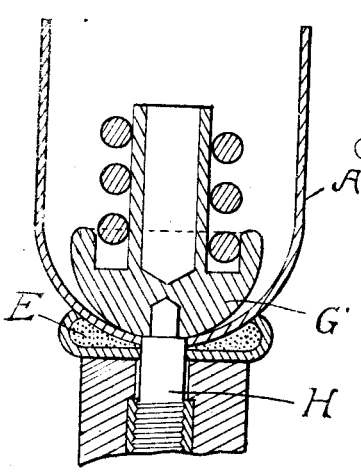
Figure 7:
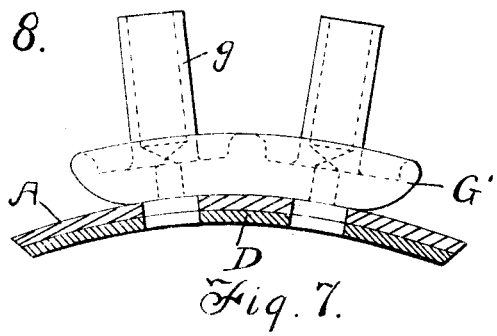

In the drawings, Figure 1 is a side elevation, partly in longitudinal section, of part of a wheel provided with the improved tire. Fig. 2 is a section on the line 2—2 of Fig. 1. Fig. 3 is a detail in side elevation, partly broken away, of the rim. Fig. 4 is a section on the line 4—4 of Fig. 1. Fig. 5 is a side elevation of part of the rim, showing the manner of connecting the rim sections together. Fig. 6 is a partial section on the line 6—6 of Fig. 5. Figs. 7 and 8 are details in side elevation and section of a modified form of cup for holding the plunger.

Referring specifically to the drawings, A indicates a sheet steel rim casing pressed to the form of a channel with a rounded base shaped to fit within the clencher rim D which is suitably fastened to the felly M of the wheel.

E is a leather filling which serves to fill the rim and also acts as a cushion for the steel casing. The casing is made in two or more sections, connected together in a manner to be hereinafter described.

The tire or rim B consists of metal and its edges project laterally over and beyond the edges of the casing A to protect the same and to hold the tire in place, and said tire also has inwardly projecting flanges $b$ which fit within the edges of the casing A and has shoulders at $b'$ which abut against the edges of the casing. The rim B is held in place by rivets C which extend through the flanges of the rim and are headed against opposite sides of the casing.

The rim B is provided with a series of circular openings in which fit the plungers F, which project beyond said rim and have radial movement therein. In Fig. 4 the plunger is shown as cupped at its outer end. The inner end of the plunger F is socketed to form a seat for the end of the spring J, and is provided with a stem $f$ which works in a socket $g$ of the cup G which has a seat around the socket for the inner end of the spring J, so that the spring is retained in compression between the cup and the plunger, and the stem and socket, in connection with the opening in the rim B, form guides for the radial movement of the plunger incident to shock or weight. The tension of each spring J may be increased or diminished by means of an adjusting screw H which extends through a threaded bushing K in the felly and through an opening in the rim and tire casing, with the outer end of the screw bearing in a socket on the inner side of the cup G. The inner end of the screw is flattened to receive a wrench by means of which it may be turned to raise or lower the cup G and thereby increase or diminish the tension or resistance of the spring J which supports the plunger.

As above stated the casing A is made in two or more sections joined together. A form of joint is shown in Figs. 5 and 6. In this construction plates L are attached by brazing or otherwise to extend across the ends of the sections of the casing A; the sections being drawn together by bolts M extending through said end pieces L, these bolts being exposed so that they can be operated from the outside, by means of offsets $a$ formed in the sides of the casing.

In Figs. 7 and 8 a modified form of socket is shown. Instead of a single socket G, as above described, the sockets may be made in groups of two or more, as indicated at G', to receive the stems of a corresponding number of plungers. These plural sockets are supported by screws in the same manner as above described.

said jaw being elastic, and the other end jaw being provided with a pin which is adapted to be passed through the button holes of a cuff and the free end of which is
5 adapted to enter the socket in the other jaw.

In testimony that I claim the foregoing as my invention I have signed my name in presence of the subscribing witnesses this 21st day of August, 1911.

JACOB ROSENMAN.

Witnesses:
C. E. MULREANY,
FRANK G. AT LEE.